(12) United States Patent
Sellers-Blais

(10) Patent No.: US 10,089,080 B2
(45) Date of Patent: *Oct. 2, 2018

(54) AUTOMATICALLY OPTIMIZING ANALYTICS DATABASE SERVER

(71) Applicant: IFWIZARD Corporation, Coeur d'Alene, ID (US)

(72) Inventor: Dominic Samuel Sellers-Blais, Coeur d'Alene, ID (US)

(73) Assignee: IFWIZARD Corporation, Coeur d'Alene, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/627,081

(22) Filed: Jun. 19, 2017

(65) Prior Publication Data

US 2017/0293474 A1  Oct. 12, 2017

Related U.S. Application Data

(60) Division of application No. 14/697,475, filed on Apr. 27, 2015, now Pat. No. 9,710,238, and a continuation-in-part of application No. 14/670,313, filed on Mar. 26, 2015, now abandoned.

(51) Int. Cl.
| | |
|---|---|
| *G06F 9/44* | (2018.01) |
| *G06F 9/445* | (2018.01) |
| *G06F 8/30* | (2018.01) |
| *G06F 8/35* | (2018.01) |
| *G06F 8/41* | (2018.01) |
| *G06F 8/54* | (2018.01) |

(52) U.S. Cl.
CPC ............... *G06F 8/30* (2013.01); *G06F 8/35* (2013.01); *G06F 8/41* (2013.01); *G06F 8/54* (2013.01); *G06F 9/44* (2013.01)

(58) Field of Classification Search
CPC .................................. G06F 8/30; G06F 8/35
See application file for complete search history.

(56) References Cited

U.S. PATENT DOCUMENTS

| | | | | |
|---|---|---|---|---|
| 4,558,413 A | * | 12/1985 | Schmidt .............. | G06F 8/71 707/695 |
| 6,681,383 B1 | | 1/2004 | Pastor | |
| 7,895,568 B1 | * | 2/2011 | Goodwin ............. | G06F 8/35 717/107 |
| 8,510,762 B1 | * | 8/2013 | Gregorio ............. | G06F 8/36 717/104 |
| 8,893,077 B1 | | 11/2014 | Aiuto | |

(Continued)

*Primary Examiner* — Chat C Do
*Assistant Examiner* — Douglas M Slachta
(74) *Attorney, Agent, or Firm* — FisherBroyles LLP; Micah Stolowitz

(57) ABSTRACT

A system and method for automatically optimized statistical analysis by computer is disclosed. Given a programmatic definition of the data model, the system generates, manages, and interfaces optimized computer code for use by higher level client applications. The method by which the computer generated code is transparently compiled and linked for remote access by clients provides near peak numerical efficiency without any human optimization in the client space. The configuration of model subsystems is designed to allow flexible general purpose analytics as well as specialized machine learning through optimizing feedback mechanisms.

20 Claims, 15 Drawing Sheets

(56) References Cited

U.S. PATENT DOCUMENTS

| | | | |
|---|---|---|---|
| 2007/0143770 A1* | 6/2007 | Kaler | G06F 9/546 |
| | | | 719/313 |
| 2009/0210401 A1* | 8/2009 | Kaufman, Jr. | G06F 17/30424 |
| 2011/0153624 A1 | 6/2011 | Aigner | |
| 2012/0159432 A1 | 6/2012 | Ahadian | |
| 2012/0174070 A1* | 7/2012 | Jones | G06F 9/547 |
| | | | 717/124 |
| 2013/0103705 A1 | 4/2013 | Thomas | |
| 2013/0339936 A1* | 12/2013 | Boulos | G06F 9/45508 |
| | | | 717/153 |
| 2014/0046936 A1 | 2/2014 | John | |
| 2014/0047408 A1* | 2/2014 | Jesurum | G06F 8/315 |
| | | | 717/104 |
| 2014/0059514 A1* | 2/2014 | Hosmer | G06F 8/35 |
| | | | 717/104 |
| 2015/0347107 A1* | 12/2015 | Munshi | G06F 8/47 |
| | | | 717/147 |
| 2016/0147512 A1* | 5/2016 | You | G06N 5/04 |
| | | | 717/153 |

* cited by examiner

AUTOMATICALLY OPTIMIZING ANALYTICS DATABASE SERVER

RELATED APPLICATIONS

This application is a divisional application of U.S. application Ser. No. 14/697,475, filed Apr. 27, 2015, now issued as U.S. Pat. No. 9,710,238 which is a continuation-in-part (CIP) of U.S. application Ser. No. 14/670,313 filed Mar. 26, 2015, all of which are incorporated herein by this reference in their entirety.

COPYRIGHT NOTICE

©2015 IFWIZARD CORPORATION. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

TECHNICAL FIELD

The present disclosure relates to computerized statistical analysis. In particular, the present invention relates to high performance model optimization and analytics.

BACKGROUND OF THE INVENTION

The largest drawbacks in traditional optimization, especially for applications that rely on accessing large datasets, remain significant barriers needing solutions: namely, the sophisticated programmer knowledge that traditional optimization requires, the fragility of tuned solutions in dynamic analyses, and the abundant software development time needed to create an optimized solution. The need remains for improvements in automatically optimizing database analytics operations to improve performance and flexibility while reducing reliance on application programmer skills.

SUMMARY OF THE INVENTION

The following is a summary of the invention in order to provide a basic understanding of some aspects of the invention. This summary is not intended to identify key/critical elements of the invention or to delineate the scope of the invention. Its sole purpose is to present some concepts of the invention in a simplified form as a prelude to the more detailed description that is presented later.

It is therefore an object of the present invention to provide a computerized analytics system which overcomes the aforementioned problems and shortcomings of the prior art. It is a further object of the present invention to provide a computerized programmatic mechanism for enumerating, querying, and analyzing stored statistical data. It is a further object of the present invention to provide the elaboration of functional definitions of statistical data and their interactions.

Another object is to provide a computer-implemented database analytics system comprising: an API access layer arranged to enable a client to access the system, wherein the API access layer includes a base client library implemented in a selected target programming language; a data model manager component for storing at least one data model in the system, wherein the stored data model includes a programmatically defined structure of the model, and at least one dependent analytical function associated with the model; a data model source code generator configured to convert the stored data model to an internal source code file; an interface generator component, configured to generate a model specific interface library that is conformant with a syntax of the target programming language and that matches the defined structure of the stored data model; and further wherein the interface generator component is configured to implement the dependent analytical function; and a compiler and linker component arranged to compile the internal source code file into native machine code for linking into a function table associated with the data model so that operations expressed by the client using the model specific interface library of the API access layer may be executed utilizing native machine code on the server.

Another object of the present invention to provide an evaluating monitor of changes to said functional definitions for those which require a compilation action. It is still a further object of the present invention to provide a compilation subsystem that allows the computerized generation of optimized analytics program code, source compilation, and dynamic linking into the interaction mechanism. It is still a further object of the present invention to provide a set of feedback mechanisms that allow for automatic continuous optimization of computerized models.

Additional aspects and advantages of this invention will be apparent from the following detailed description of preferred embodiments, which proceeds with reference to the accompanying drawings.

DETAILED DESCRIPTION OF PREFERRED EMBODIMENTS

Figure 1:
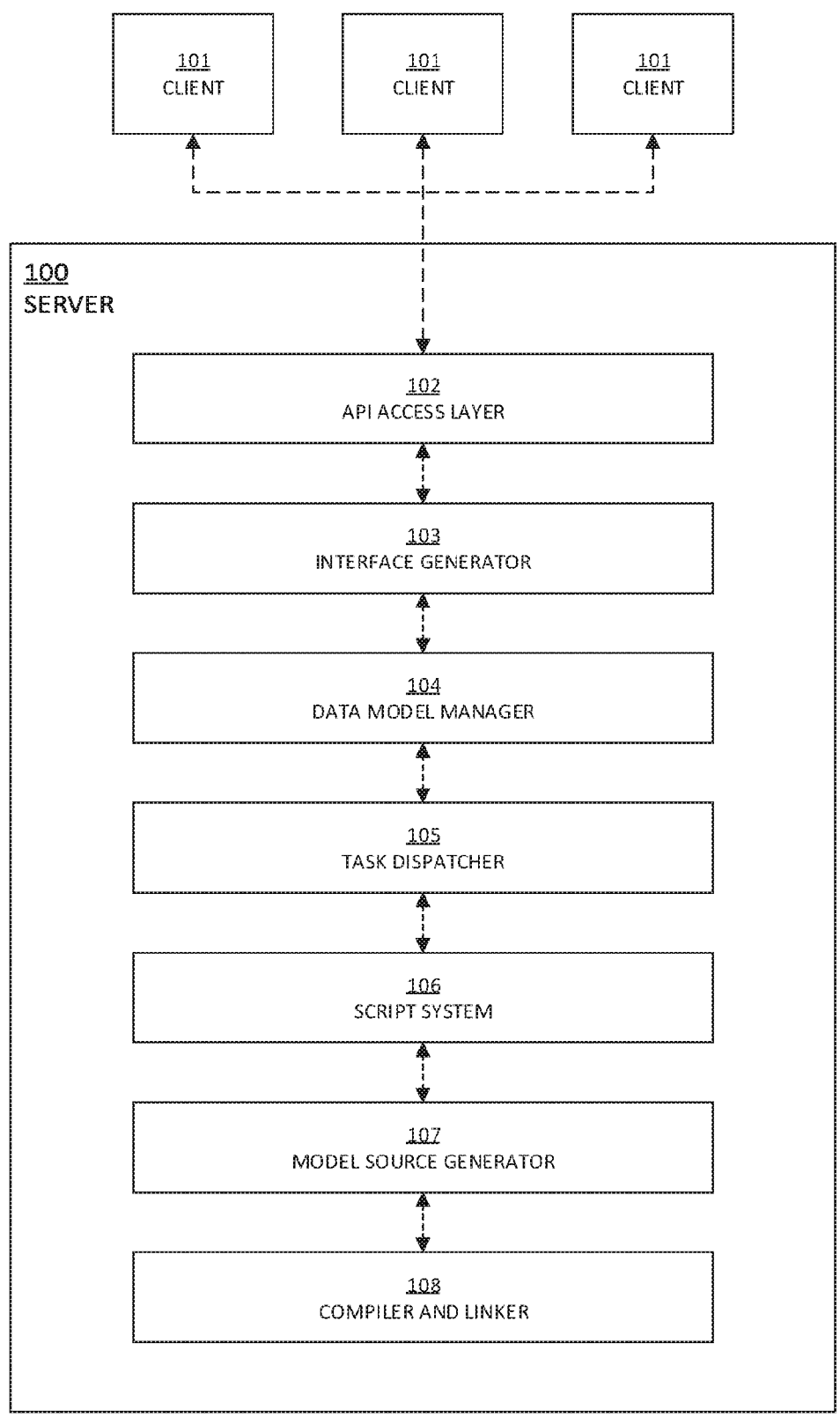
FIG. 1 is a block diagram of an example server system consistent with the present disclosure.

The following description is intended to provide a detailed description of examples of some embodiments and aspects of the invention and should not be taken to be limiting of the invention itself. Rather, any number of variations may fall within the scope of the invention, which is defined in the claims following the description.

The present disclosure includes a method, a data processing system and a computer program product that compiles a source code program into a several object code files where the method includes the steps of defining a set of computerized statistical models and their functional interactions; determining changes that require an optimizing compilation and linking action; dynamically vending programmatic libraries for accessing and interacting with the models; executing model interaction in a performant, scalable, and simultaneous manner; and optionally propagating experimental model results as feedback for continuous and automatic optimization either in terms of execution performance or accuracy.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which are implemented via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which are implemented on the computer or other programmable apparatus provide processes for implementing the functions/acts specified in the flowchart and/or block diagram block or blocks.

Referring to the system overview diagram of FIG. 1, the server 100 is the central mechanism for providing the functionality described herein. Accessed by one or more clients 101, the server 100 allows access to the analytics system through the API (Application Programming Interface) access layer 102. It should be understood that a typical computer system providing the server 100 or a client 101 contains many other components not shown, which are not essential to an understanding of the present invention.

In one embodiment, the access layer 102 is presented through an HTTP (Hypertext Transfer Protocol) communication over an IP (Internet Protocol) computer network connection. In this particular embodiment, the HTTP communication, which may be optionally cryptographically secured through a TLS (Transport Layer Security) application layer implementation, provides access through a REST (Representational State Transfer) API with JSON (Javascript Object Notation) elaboration of structures and Base64 encoded raw data.

The client 101 access is built on top of a base client library available in multiple programming languages. This base client library provides authentication, RBAC (Role Based Access Control), transparent error recovery, data marshalling, and a "native" interface for the programming language of choice. The access layer 102 interfaces with the base client library to provide a model specific programmatic interface through the interface generator 103. This generator creates a programming library in the client's language of choice (the "target programming language") that directly matches the model's attributes and functionality for optimal convenience and efficiency of the client developer. Illustrative target programming languages may include without limitation any or all of the following:

Ada (GNAT sockets)
C (BSD/POSIX sockets or Winsock)
C++ (Qt or Boost ASIO)
C#
Clojure
D
Go
Java
Javascript
Object Pascal (Delphi-compatible)
Objective-C
PHP
Python
Ruby The interface generator 103 generates the interface based on the data model 200 stored within the data model manager 104, which is a dynamic container of meta-information about all analytical models in the server 100. Preferably the model manager 104 provides for the creation, deletion, enumeration, and use of the models in their various subsystems.

When a specific model task, such as the creation of a new model, is specified by the access layer 102 to the data model manager 104, the task may be passed to a task dispatcher 105 which enables parallelized task completion while maintaining consistent, known model state. This standard goal of parallel programming is thereby provided upstream of the client 101, greatly simplifying and streamlining a traditionally complex area of optimization.

A wide variety of data models can be implemented. Models may contain programming scripts as part of their definition to provide complex functionality. The server's 100 scripting system 106 preferably provides a large set of mathematical, statistical, textual, and logical functions available in a deterministic and highly efficient context. In one particular embodiment of the present invention, this efficiency is gained by trans-compiling the scripts to the highly performant "C" programming language as part of the source generation of the models by the model source generator 107, which converts the model to "C" source files. These source files are then compiled by an optimizing "C" compiler and dynamically linked back into the server 100 process space by the compiler and linker 108 system.

The scripting language has a strictly deterministic operation allowing real-time performance characteristics primarily through preventing all looping outside of list enumeration. This intentional limitation includes "while"-style conditional loops, "goto", and recursion. As a purely functional language, no side-effects or modifiable variables are permitted within the script functions. Outside of the special case of analysis reduction functions 804, there is intentionally no facility for defining functions visible across scripts, nor common programming-in-the-large idioms such as object-oriented programming, complex type definition, namespaces, etc.

Though without sophisticated facilities for developing reusable libraries, the scripting language includes a large set of mathematical, statistical, textual, and logical functions built-in and these are automatically available to all scripts. Similar to the Lisp programming language, scripts are composed entirely of nested programmatic s-expressions each with a function name and its arguments, and each returning a result. As such, the syntax is minimal and there are no operator symbols such as "+", order of operation rules, and other complexities contained in most other programming languages.

The scripting language may be written in either parenthesized prefix notation (Lisp-style) or function notation (Fortran-style). Prefix and function notation may also be freely mixed, although this is generally not advisable due to reducing programmer readability. The following two example scripts, though using different notational styles, do the same function (i.e. return the boolean value, 'true', if var_x and var_y add up to 10; else return 'false').

Prefix notation: (if (eq (add var_x var_y) 10) true false)

Function notation: if(eq(add(var_x, var_y), 10), true, false)

As discussed further below, scripts may be used in defining mapping transforms 402, defining filter criteria 702, defining data reductions for analysis 802, and as noted in otherwise defining a data model structure and its initialization 502.

Figure 2:
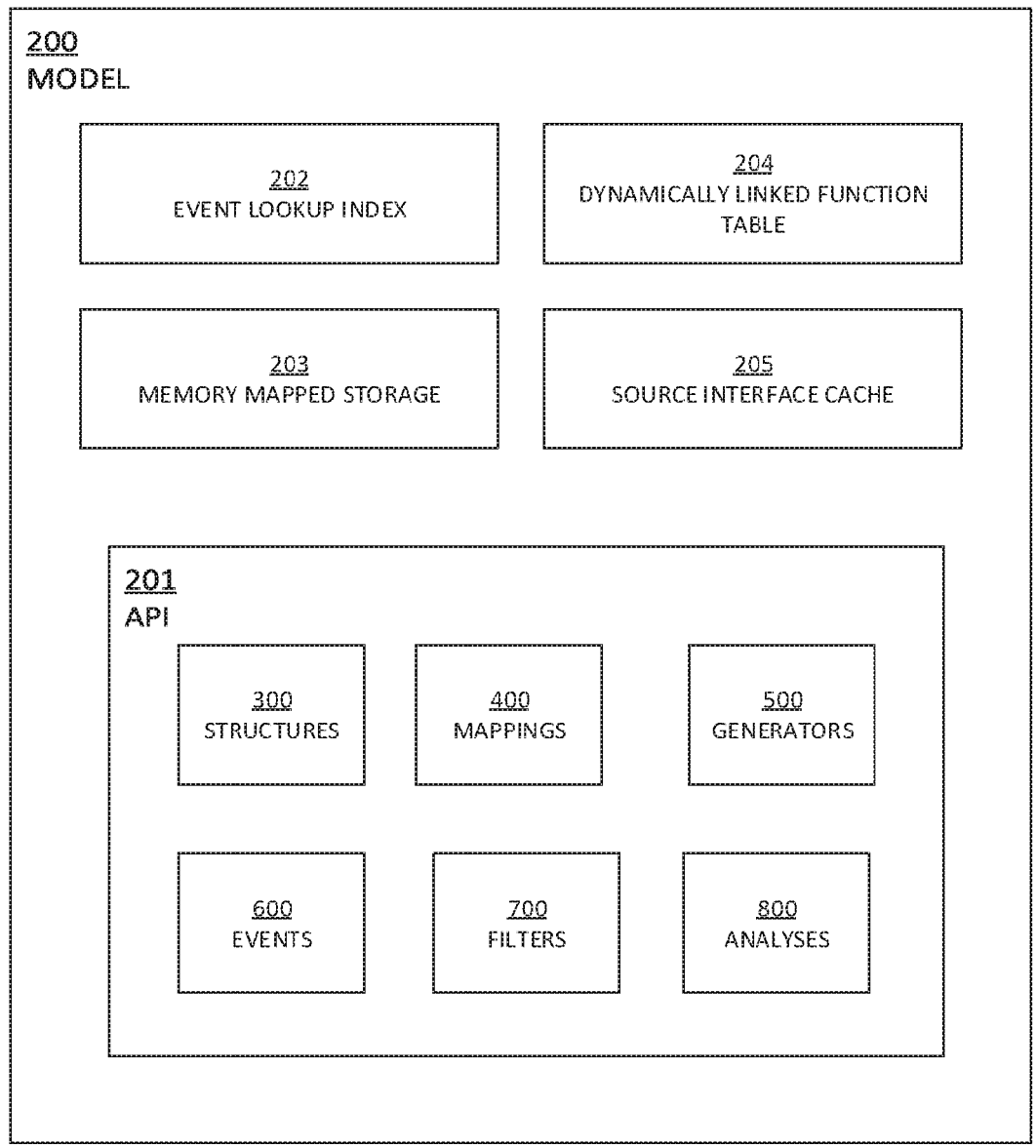
FIG. 2 is a block diagram showing an example of a model subsystem consistent with the present disclosure.

FIG. 2 is a block diagram showing a presently preferred set of model subsystems available in the model manager's 104 data models 200. The model 200 provides for the lookup of specific model instance events which are particular embodiments or instantiations of the model structure through the event lookup index 202. The memory mapped storage 203 contains the disk-backed memory access to the events so indexed. The interface generator's 103 source may be cached within the model's 200 source interface cache 205.

The access layer 102 preferably interfaces directly with the compiled and linked machine code for each of the model's 200 API subsystems 201. These APIs 201 are directly executable through the dynamically linked function table 204 and include the model's 200 structures 300, mappings 400, generators 500, events 600, filters 700, and analyses 800, described in more detail in the subsequent figures.

Figure 3:
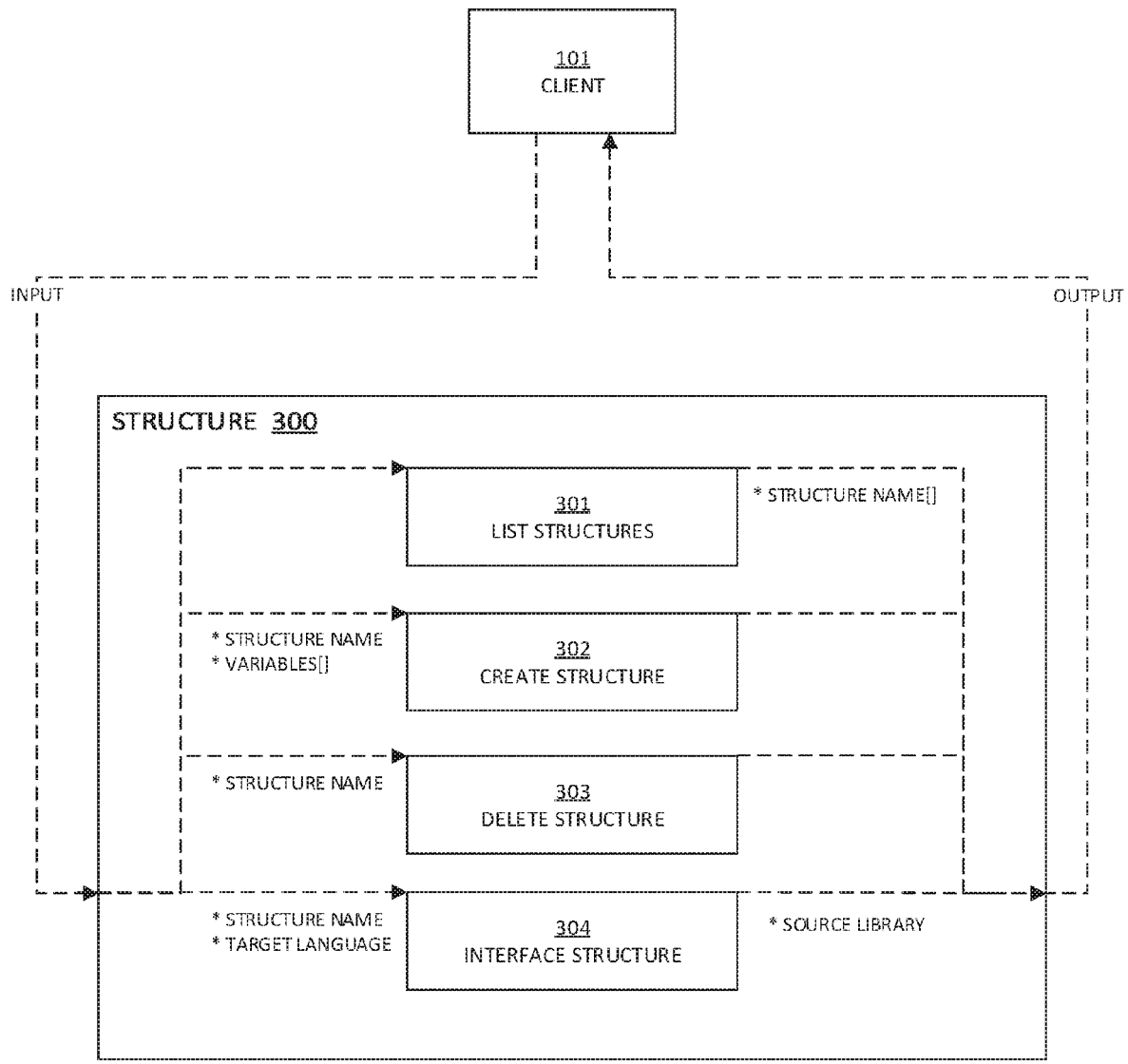
FIG. 3 is a block diagram showing an example of structure subsystem detail consistent with the present disclosure.

FIG. 3 illustrates a structure subsystem 300. Before a model 200 can be used by a client 101, it must be defined and these foundational definitions are known as structures 300. Internally, a structure 300 may comprise a list of named variables and their formats. For example, a structure 300, "tire", might have variables such as "mileage", "wet_grip", "retreadability", "dry_handling", and so on. Variables may include the following types with their corresponding constraints:

TEXT: A sequence of bytes that are frequently UTF-8 or ISO-8859 encoded characters with a fixed maximum length. The given length preferably is pre-allocated for each instance (event) of this data. A text variable's constraints must include its length.

BLOB: A sequence of data bytes or encoded characters with a potentially unbound length. A structure that contains blobs will be much slower for certain operations than one that only contains the other variable types due to optimizations available with a fixed structure size. A blob variable's constraints may include its length.

INTEGER: A signed integer number without a fractional component such as "771" or "0". The potential range depends on the "size" constraint which selects between 32-bit, 64-bit, and arbitrary precision. Arbitrary precision integers are much slower than other numerical formats. Integer constraints include its minimum, maximum, and size ("32", "64", or "arbitrary").

REAL: A floating point number with fraction and exponent components such as "3.14" or "$2.5^{-68}$". The precision is selectable from single- and double-precision with moderately faster performance for single-precision. Real constraints include minimum, maximum, and precision ("single" or "double").

BOOLEAN: A simple binary flag with only "true" (1) or "false" (0) as possible values.

ENUM: An efficient and easily testable selection between a list of given named labels.

Structures may have many variables to track the different data occurring in each recorded event. These data form the basis for the other functions and features in the model 200 as further described below.

The API for the structure 300 may include the command to list structures 301, which returns a list of all structures 300 available in the server 100. Additionally, the client 101 may create a new structure 302, which requires the structure name and a list of variables. The client 101 may also delete a previously created structure 303. Finally, the client 101, through the interface generator 103, may expand out the particular functionality of a given structure 300 with a specific target programming language through the command to interface with the structure 304. The command returns the programming library for that specific structure and language. In other words, the interface generator component preferably is configured to generate a model specific interface library that is conformant with a syntax of the target programming language and that matches the defined structure of the stored data model. This is one of several features designed to improve performance while enabling the application programmer (client 101) to operate in a target programming language of her choosing. Creating 302 or deleting 303 a structure 300 triggers the compilation and linking 108 system and modifies the interface models created by the interface generator 103.

Figure 4:
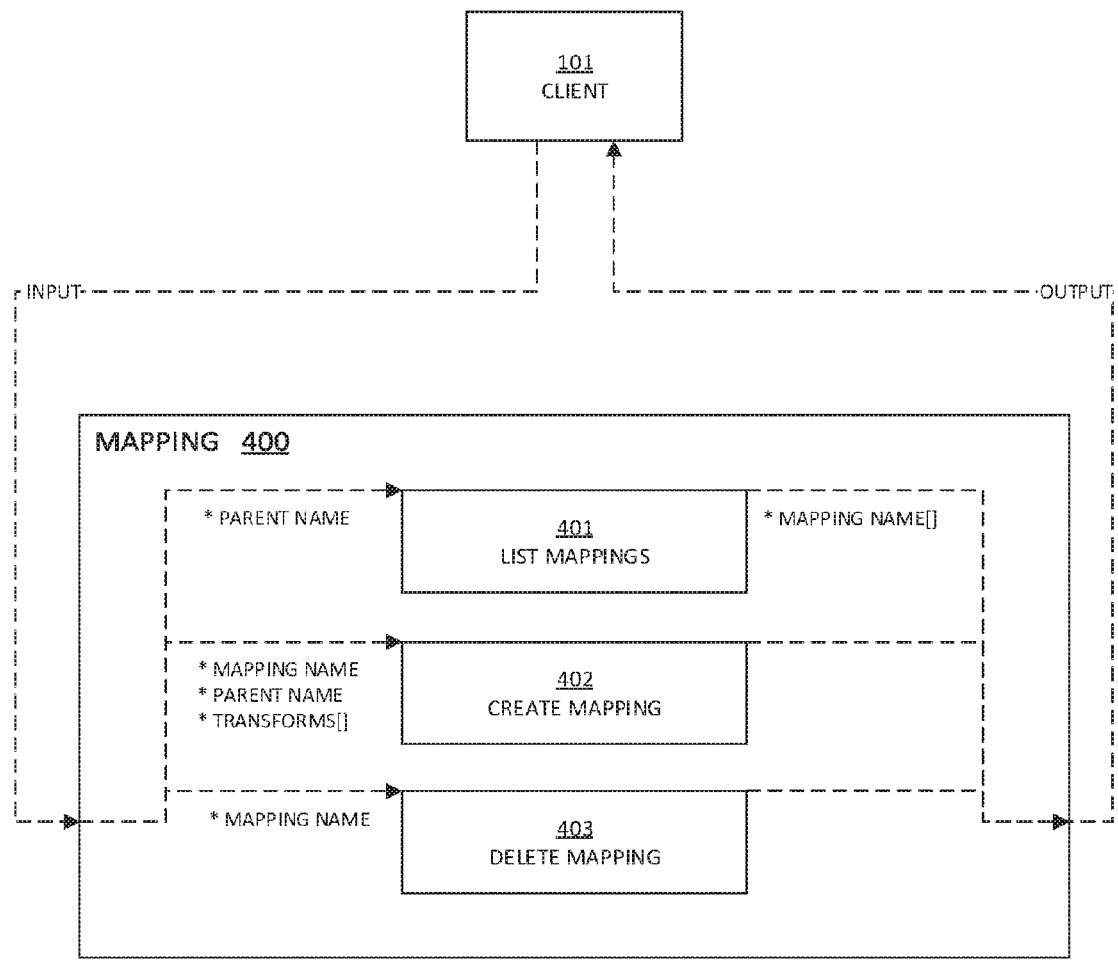
FIG. 4 is a block diagram showing an example of mapping subsystem detail consistent with the present disclosure.

FIG. 4 shows an example of a mapping subsystem 400. Once a structure 300 has been defined, a transformed or partial view of it may be created through a mapping 400 belonging to the structure 300. Additionally, mappings 400 can be derived from another mapping 400, except for circular references. Mappings 400 may provide their own set of transformed variables through pure functions using the scripting system 106. In an embodiment, mapping functions may use any of the following to generate a mapped transform variable:

Any numeric, textual, Boolean, or enum constant

Any variable of the parent structure or transform of the parent mapping

Any idempotent scripting function.

The mapped transform's type may be set as with structure variables, but must be the same or castable from the return value. Mapped transforms have no constraint pre-conditions as they are not directly set by the client or generated. Mapped transform names may be different or identical to parent variable/transform names, but the mapping name itself must be unique among all structures and mappings.

The API for the mapping 400 may include the command to list mappings 401, which returns a list of all mappings 400 available in the server 100 for a given structure 300. Additionally, the client 101 may create a new structure 402, which requires the mapping name, the name of the parent structure 300 or mapping 400, and a list of mapping transforms. The client 101 may also delete a previously created mapping 403. Creating 402 or deleting 403 a mapping 400 triggers the compilation and linking 108 system and modifies the interface models created by the interface generator 103.

Figure 5:
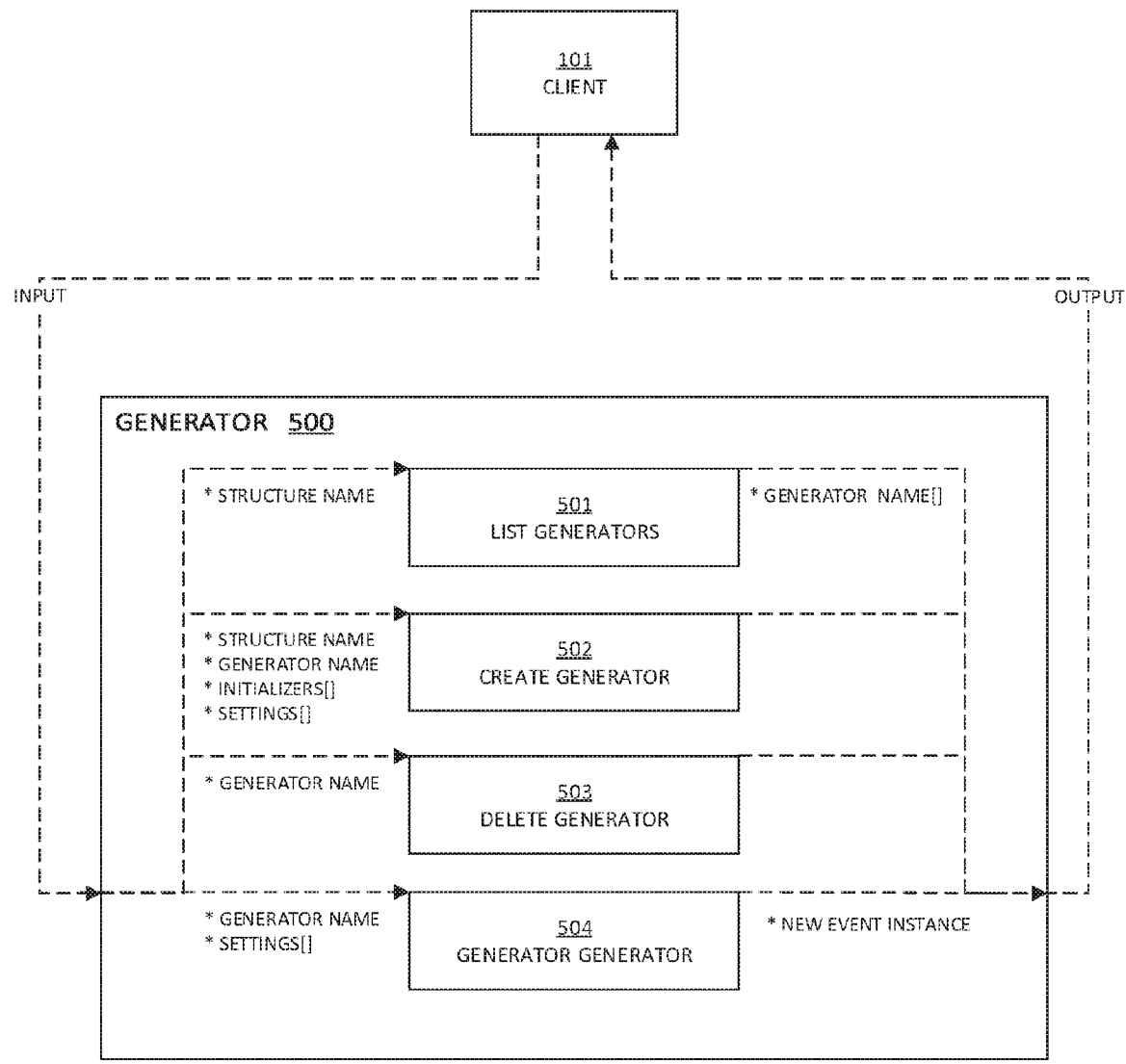
FIG. 5 is a block diagram showing an example of an example of generator subsystem detail consistent with the present disclosure.

FIG. 5 shows the generator subsystem 500. When the client 101 wishes to store data, it needs to first generate an instance of the target structure 300. This newly generated instance, known as an "event" 600, is generated according to rules of a previously defined generator 500. A generator acts similar to a constructor in OOP (Object-Oriented Programming), providing initialization that can potentially be programmatically complex. While initialization can also be done in client code, the use of generators can improve efficiency, convenience, and consistency across multiple client environments.

Generators 500 contain a list of initializers for a set of the structure's 300 variables. Each initializer does the work of automatically setting the starting value of its corresponding variable using a programming script. Unlike mapping 400 transforms, the generators 500 initializers do not need to be idempotent (the property of certain operations in mathematics and computer science that can be applied multiple times without changing the result beyond the initial application). This allows for generators 500 that can, for example, use random values for some variables.

If a generator 500 does not initialize one of the event's variables, the client 101 should set it explicitly before saving the event. Using custom defined generators 500 is optional as each structure 300 automatically has an implicit generator 500 created for it which simply requires all variables to be explicitly set.

The API for the generator 500 may include a command to list generators 501, which returns a list of all generators 500 available in the server 100 for a given structure 300. Additionally, the client 101 may create a new generator 502, which requires the generator name, the name of the parent structure 300, a list of generator initializers, and a list of settings which are input variables with name, type, and constraints that are to be provided during generation and which may be used by the initializers. The client 101 may also delete a previously created generator 503. Finally, the client 101 may generate 504 a new event 600 for the structure 300 according to the rules of the generator 500. If settings were provided when the generator 500 was created 502, they must be provided during generation 504. The generated event 600 must be explicitly saved in order to be visible and persisted within the server 100. Creating 502 or deleting 503 a generator 500 triggers the compilation and linking 108 system and modifies the interface models created by the interface generator 103.

Figure 6:
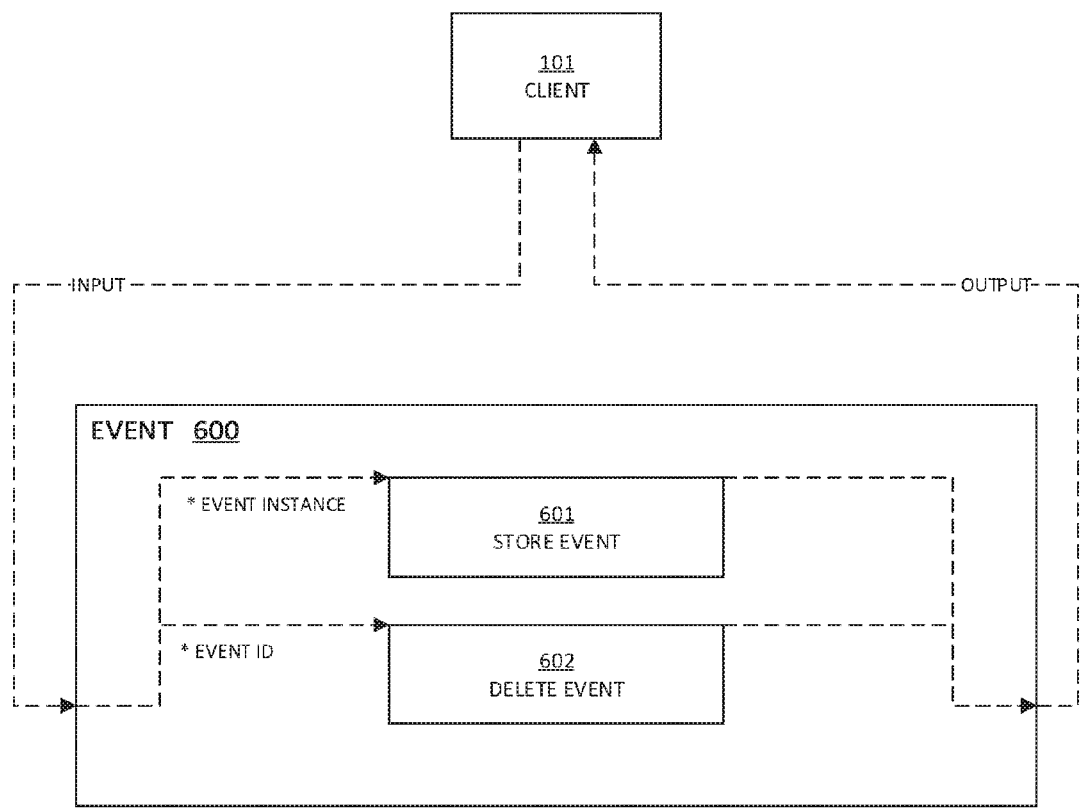
FIG. 6 is a block diagram showing an example of the event subsystem detail consistent with the present disclosure.

FIG. 6 shows an example of the event subsystem 600. An event 600 is a particular instantiation of a structure's 300 model. All data in the server 100 is stored and processed as recorded events. Events 600 may be interacted with as "Plain Old Objects" within the client language, providing an easy and natural interface to the underlying data model. Saveable events 600 can only exist for structures 300 while unsaveable events can be returned by filters 700 applied to mappings 400. Events 600 must have all variables set either explicitly or through a generator 500 in order to be saved. Events 600 may not be saved more than once or modified after saving; a new event 600 must be created or an existing event 600 cloned.

In addition to their variable values, events 600 preferably have the following intrinsic meta-information which may be accessed:

Structure name

Time of generation

Whether all variables have been set

If and when saved

A globally unique ID

The API for the event 600 includes the command to store the event 601 to the server 100. Additionally, a previously saved event may be deleted 602 given a particular globally unique event ID.

Figure 7:
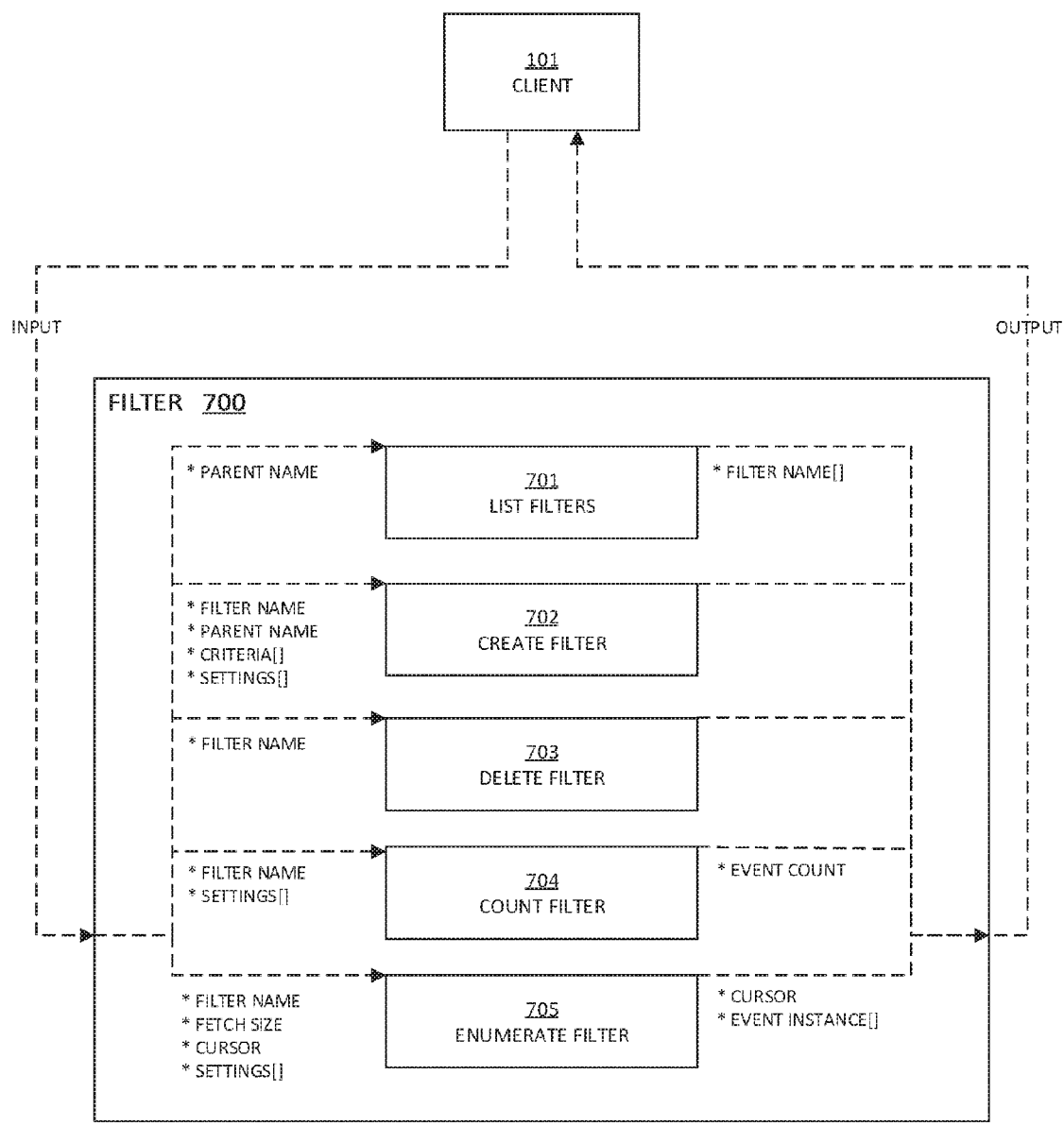
FIG. 7 is a block diagram showing an example of the filter subsystem detail consistent with the present disclosure.

FIG. 7 shows an example of a filter subsystem 700. Filters 700 are used for querying the server 100 and enumerating events 600. Filters 700 have one or more criteria which preferably are themselves script functions with access to all structure 300 variables or mapping 400 transforms, and return boolean values. All criteria must return "true" in order for the filter 700 to accept an event 600; if a single criterion returns "false", the filter will skip the tested event. Each structure 300 or mapping 400 may have an implicit filter 700 with no criteria which returns all events 600 for the structure 300 or mapping 400.

The API for the filter 700 may include a command to list filters 701, which returns a list of all filters 700 available in the server 100 for a given structure 300 or mapping 400. Additionally, the client 101 may create a new filter 702, which requires the filter name, the name of the parent structure 300 or mapping 400, a list of filter criteria, and a list of settings which are input variables with name, type, and constraints that are to be provided during filtering and which may be used by the criteria. The client 101 may also delete a previously created filter 703. Further, the client 101 may count 704 all events 600 for a specified filter 700. If settings were provided when the filter 700 was created, they must also be provided when counting 704.

Finally, the client 101 may enumerate 705 a given filter 700, i.e. enumerate the filtered results, returning entire event instances 600 up to a given fetch size along with a cursor. The cursor may be passed back on an additional call to the filter 700 in order to continue the enumeration from the last returned event. If no cursor is returned, all events have been retrieved. If settings were provided when the filter 700 was created, they must also be provided when enumerating 705. Creating 702 or deleting 703 a filter 700 triggers the compilation and linking 108 system and modifies the interface models created by the interface generator 103.

Figure 8:
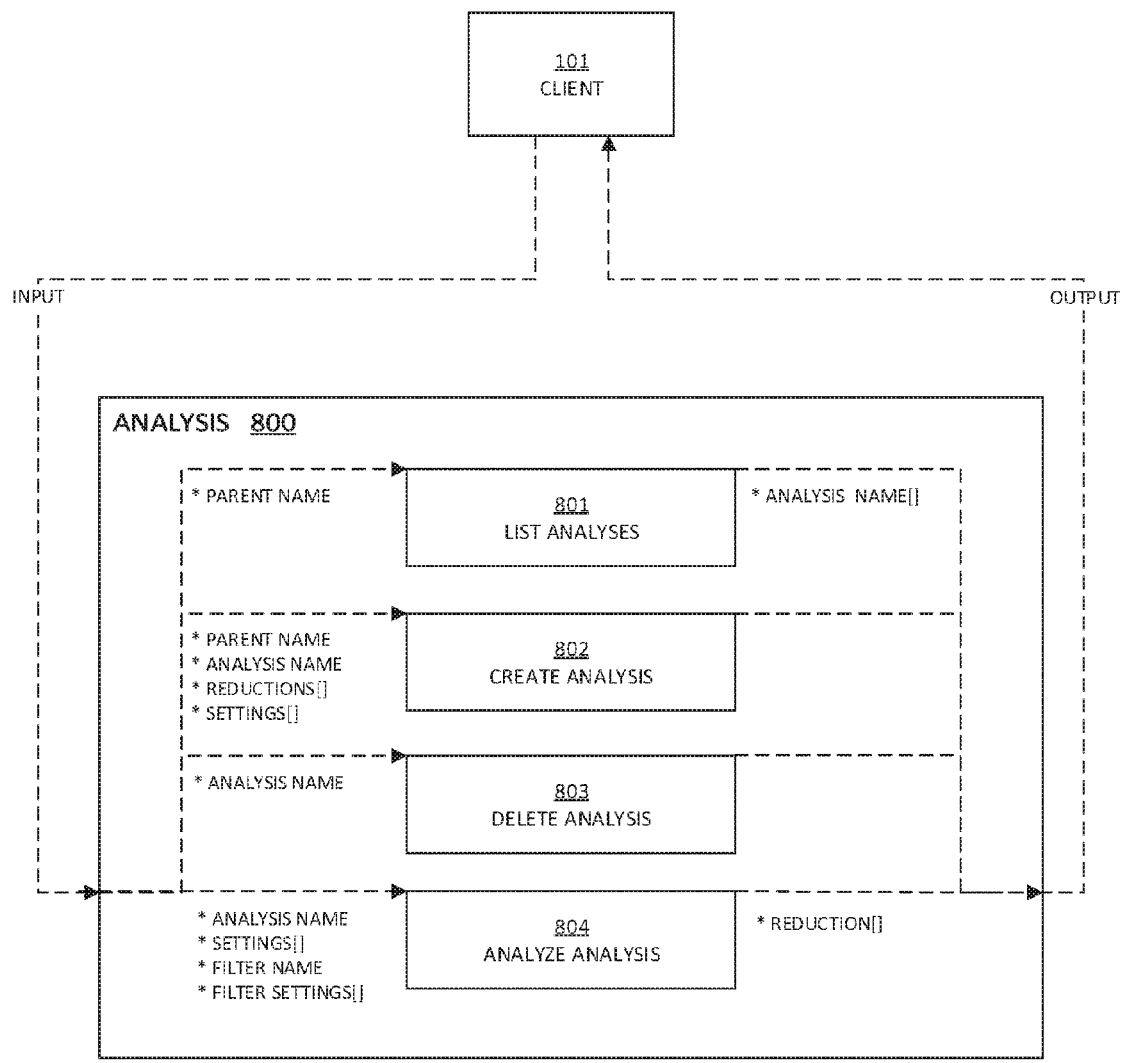
FIG. 8 is a block diagram showing an example of the analysis subsystem detail consistent with the present disclosure.

FIG. 8 shows the analysis subsystem 800. An analysis 800 is a process that iteratively analyzes multiple events 600, reducing the data to a normally much smaller set of outputs. Functional scripts used to provide the reducing functions, each passed the enumerated 705 set of filtered events 600. If no event data 600 has been added or deleted since the last analyzing with given settings, a cached result may be returned.

In a preferred embodiment, reduction functions must be pure, while analyses 800 have the special property of being available to generator 500 and filter 700 scripts as callable functions. This allows for easy creation of incremental optimization and adjustment mechanisms. Furthermore, unlike all other scriptual references, analyses 800 of other structures 300 or their mappings 400 may be used as functions, permitting complex scenarios where variant experiments or data models can be related automatically.

The API for the analysis 800 may include a command to list analyses 801, which returns a list of all analyses 800 available in the server 100 for a given structure 300 or mapping 400. Additionally, the client 101 may create a new analysis 802, which requires the analysis name; the name of the parent structure 300 or mapping 400; a list of analysis reductions including the name, type, and script of each reduction; and a list of settings which are input variables with name, type, and constraints that are to be provided during analyzing and which may be used by the outputs. The client 101 may also delete a previously created analysis 803. Finally, the client 101 may analyze 804 a given analysis 800, returning a set of reductions given the analysis name, settings if they were provided during analysis creation 802, the filter 700 to use with the analysis 800, and settings for the given filter 700 if any are required. Creating 802 or deleting 803 an analysis 800 triggers the compilation and linking 108 system and modifies the interface models created by the interface generator 103.

Thus the fundamental data management process may be summarized as comprising:
 Accept high level structural and processing definitions through the API
 Convert these definitions into efficient (for example, C) source code representations
 Compile and dynamically link this source code forming internal models-as-libraries
 Provide clients with native programmatic access to these model libraries for storing, filtering, and analyzing their data.

Figure 9:
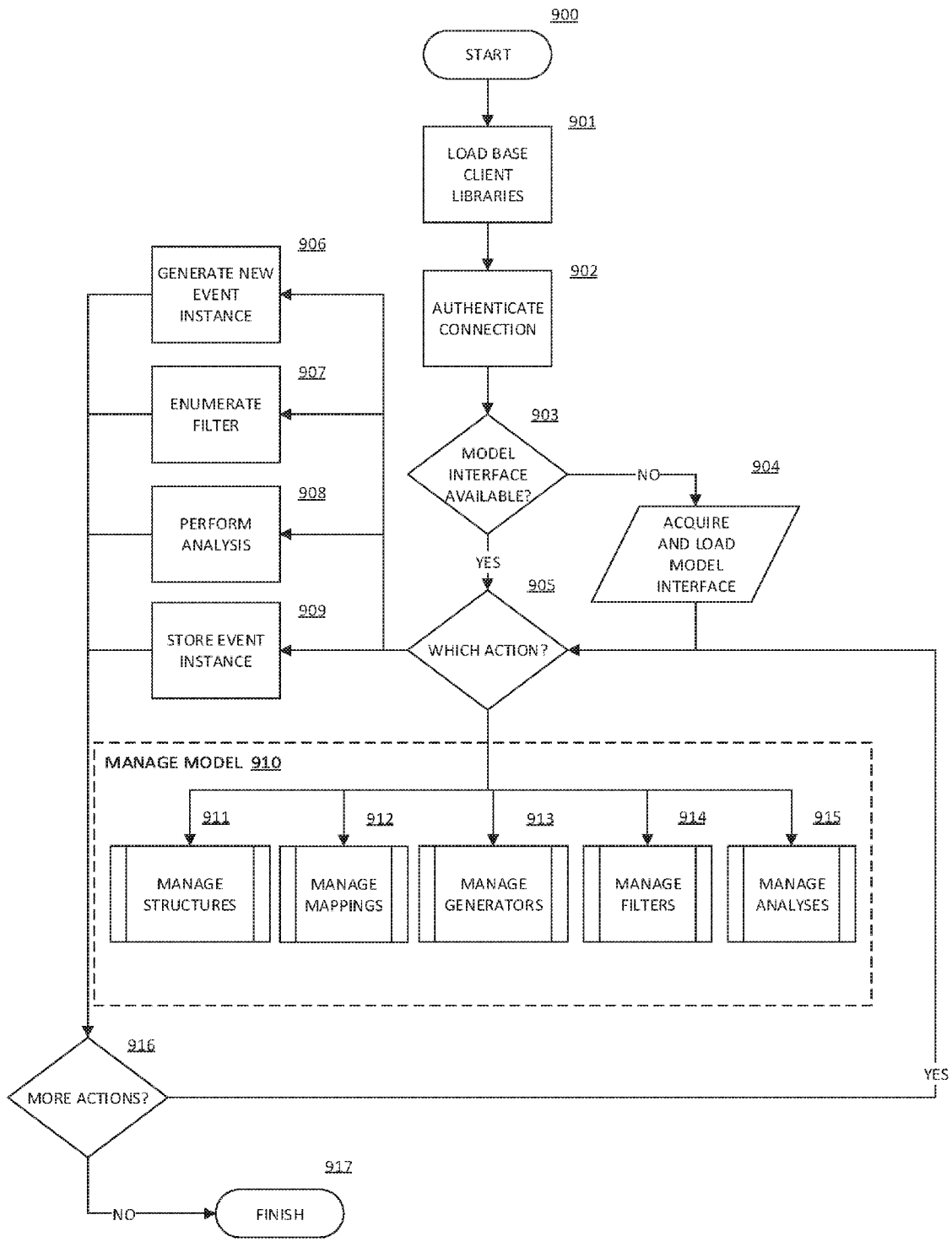
FIG. 9 is a flow chart of an example of a client access process consistent with the present disclosure.

FIG. 9 illustrates flow of a client access process in a preferred embodiment. Upon start 900, the client 101 loads the base client libraries 901 and authenticates its connection 902 to the server 100. After completing connection and authentication, model access is provided by checking whether the programmatic model interface is available 903. If it is not available, the client 101 acquires and loads 904 it from the interface generator 103.

The client 101 may then select which action 905 it would like to perform on the model 200. The client may wish to manage the model 910, by which it will access the various model subsystem APIs 201 to manage the structures 911, mappings 912, generators 913, filters 914, and analyses 915.

Alternatively, the client may wish to directly programmatically interact with the event data 600. In this case it may wish to generate a new event instance 906, enumerate a given filter 907, perform analysis reductions 908, or store a generated instance 909. This sequence may be continued via decision 916 until the client 101 has completed access 917 to the server 100.

Figure 10:
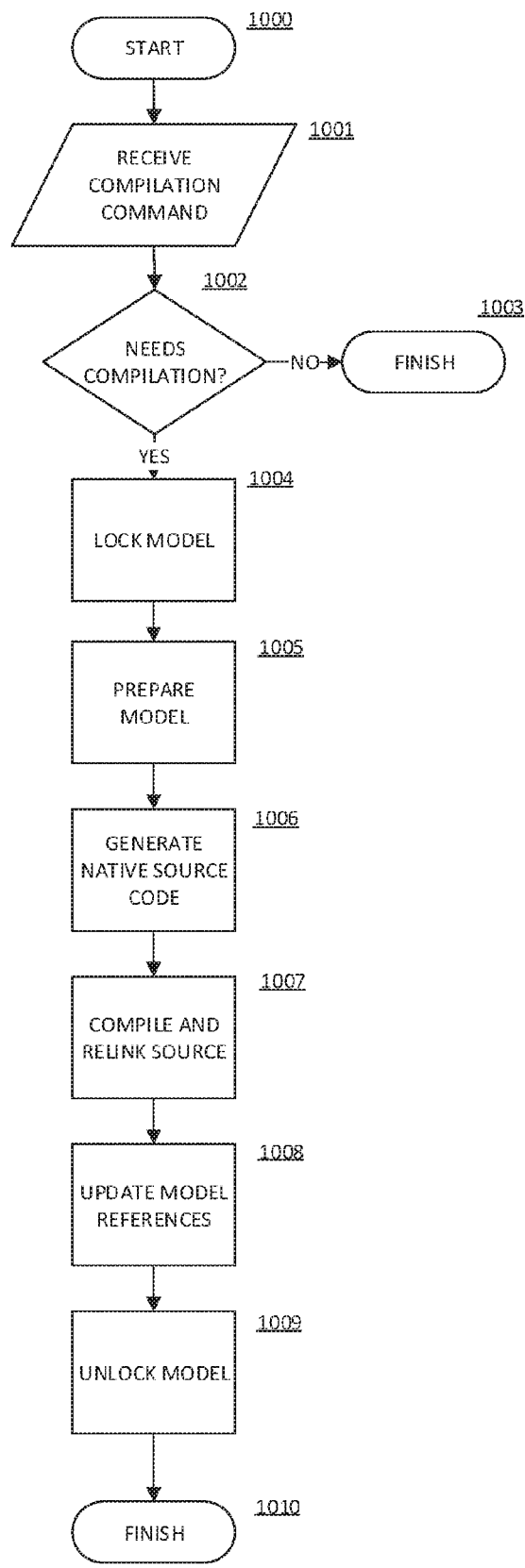
FIG. 10 is a flow chart of an example of model compilation process consistent with the present disclosure.

FIG. 10 shows the flow of the model compilation process. Upon start 1000 the server 100 receives a compilation command 1001 such as following a structure generation task 302. The server verifies 1002 that the model does, indeed, need compilation by comparing the changes with the previous meta-data for the model 200 and terminates compilation if it is not needed 1003.

If compilation is needed, the model is locked 1004. In one preferred embodiment this is done using a mutual exclusion thread lock. The model is then prepared for compilation 1005 including validation and consistency checking. The native source code for the model is then generated 1006 as further described below. This source code is then compiled and relinked 1007 dynamically into the server's 100 process space. The model's references are suitably updated 1008 including the function table 204 and the model is unlocked 1009, completing 1010 the compilation and linking process.

Figure 11:
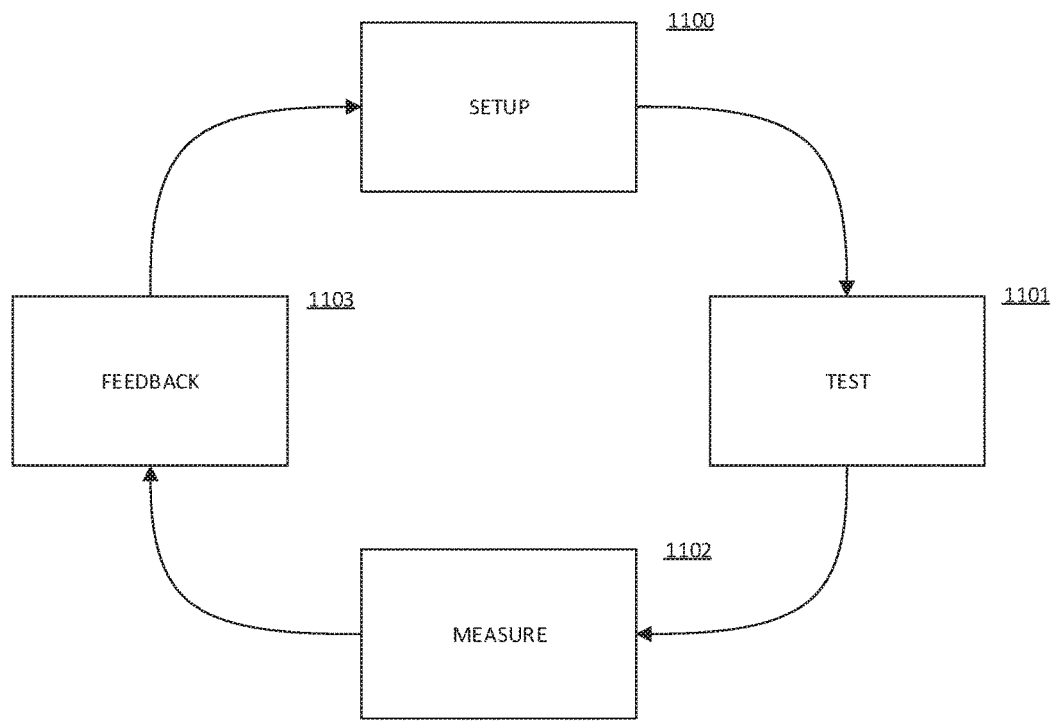
FIG. 11 is a process diagram of an example of a generic optimization pattern consistent with the present disclosure.

FIG. 11 shows an illustrative process diagram of a generic optimization process whereby the optimization is target is setup 1100 with a set of controlled and experimental variable, a test 1101 is conducted to produce the results of that configuration, the results 1102 measured and analyzed according to some metric or metrics of success or error, and these data are fed back 1103 into the setup process. As a simple example of this type of generic optimization, consider an artillery cannon designed to fire at a remote target with a variably stronger or weaker gunpowder charge. The given amount of gunpowder is the setup 1100, the firing of the cannon is the test 1101, establishing the delta between the intended target and the place of impact is the measurement 1102, and the adjustment of the following charge is the feedback 1103.

Figure 12:
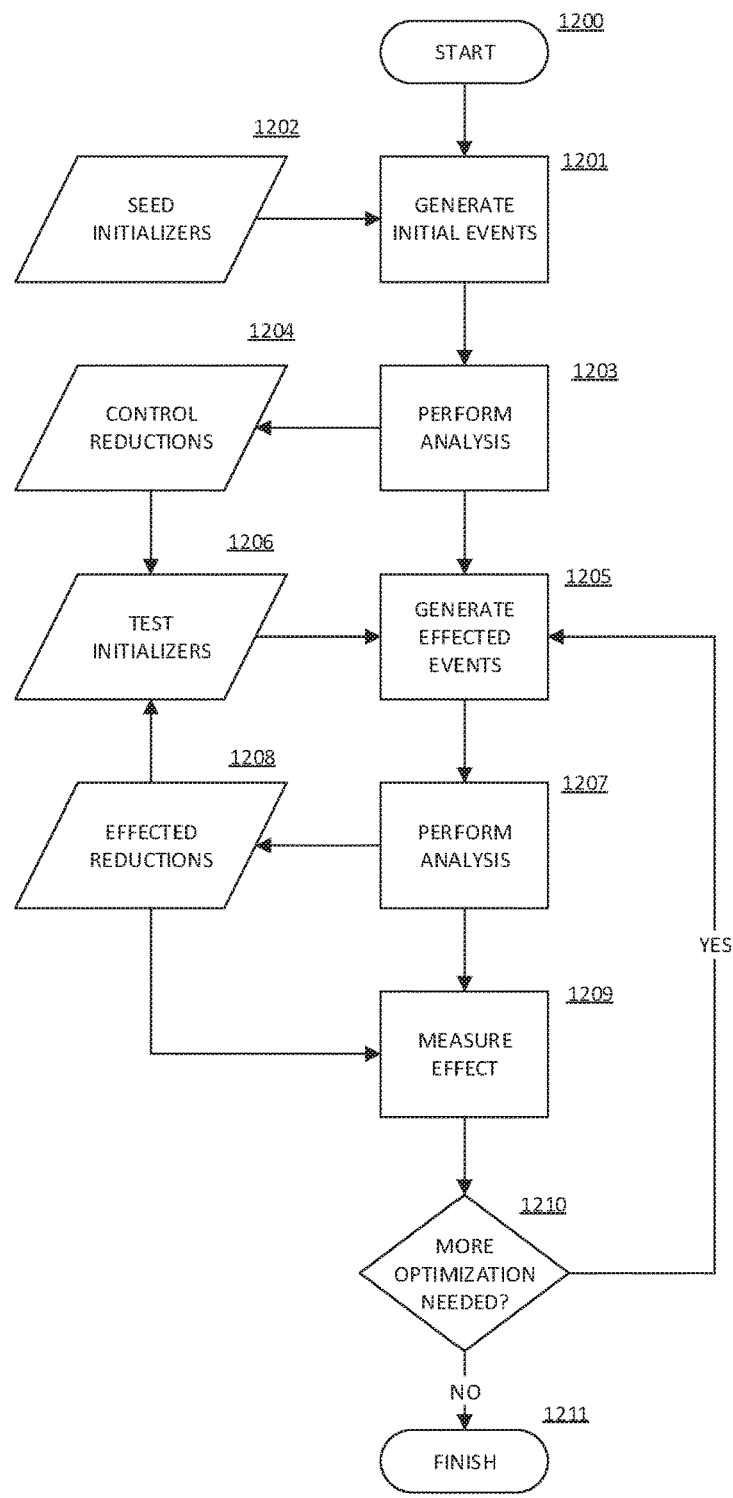
FIG. 12 is a flow chart of an exemplary experimental optimization process consistent with the present disclosure.

FIG. 12 shows the flow of an exemplary experimental optimization process. The present invention enables this kind of optimization that is oriented towards a relatively free-form optimization that may be human guided or completely automated, using a basic pattern of experimentation and analysis. Upon start 1200, the client 101 generates initial control events 1201 using seed initializers 1202. Analysis on these control events 1203 yields control reductions 1204 which are used in reference to experimental initializers 1206 when generating newly-effected events 1205. These newly-effected events are further analyzed 1207 and their reductions 1208 measured 1209 for the target effect. This process if iteratively 1210 repeated until the desired optimization is complete 1211.

Figure 13:
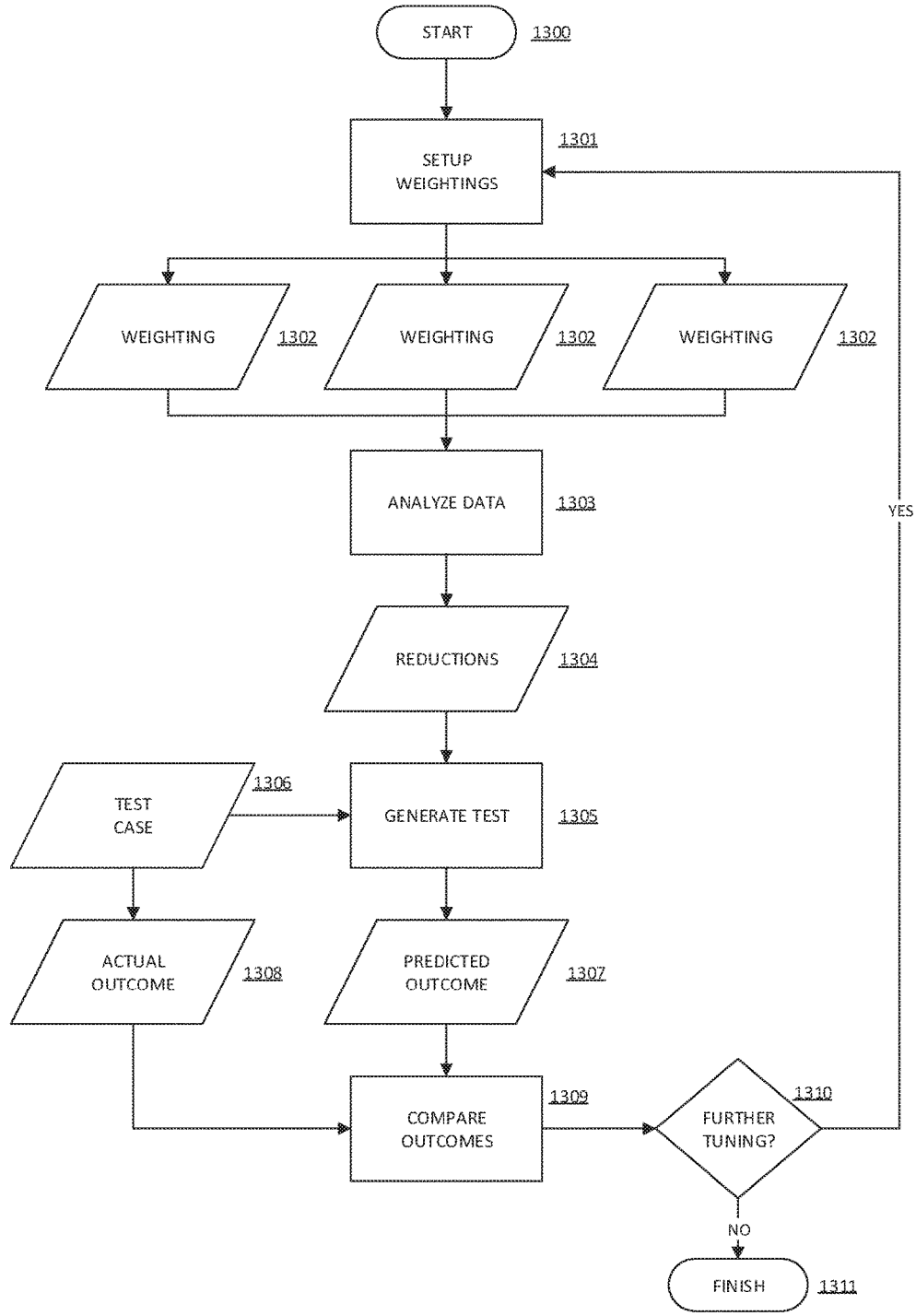
FIG. 13 is a flow chart of an exemplary predictive tuning optimization process.

FIG. 13 shows the flow of an exemplary predictive tuning optimization process. The present invention enables this kind of optimization that is oriented towards weighted prediction graphs and backpropagation, such as for an online product recommender. Upon start 1300, the client 101 sets up 1301 the initial weightings 1302 for the prediction variables. These weightings are used as settings with an analysis 1303 of some set of sample data to further derive a reduced set 1304 of weightings (this analysis may be skipped for a less "trained" version of this algorithm). These weightings are then used to generate a prediction 1307 based on a test case sample 1306. This is compared 1309 with the actual outcome 1308 and further tuning 1310 may be done, potentially using the resulting comparison, until the tuning is complete 1311.

Figure 14:
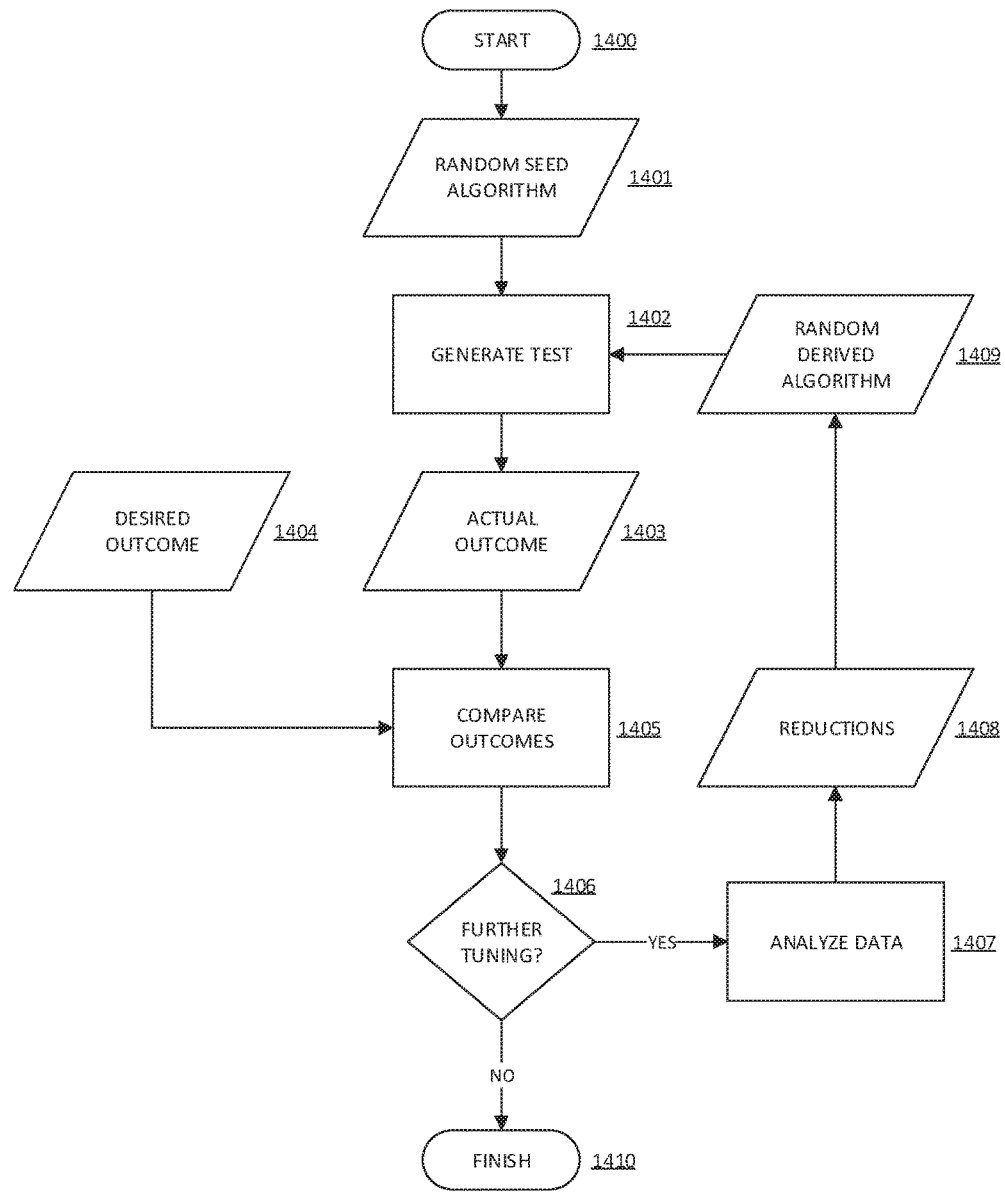
FIG. 14 is a flow chart of an exemplary genetic algorithm optimization process.

FIG. 14 shows the flow of an exemplary genetic algorithm optimization process. The present invention enables this kind of optimization that is oriented towards the gradual, unguided evolution of optimization using genetic algorithms with fully or partially random mutation and fitness criteria. Unlike the other example optimization algorithms, the genetic algorithm approach involves changing programmatic scripts. The present invention's high efficiency allows for such algorithmically designed scripts to execute with particularly high performance, making evolutionary optimization applicable to wider range of scenarios than otherwise. Upon start 1400, an initial seed algorithm is randomly generated 1401 and used to create the desired subsystems and test 1402. The test is performed and the actual outcome 1403 is compared 1405 against the desired outcome 1404. If further tuning 1406 is sought, the results are analyzed 1407 and reduced 1408 into a descendant algorithm 1409 for further testing 1402. Otherwise, the optimization is complete 1410.

Figure 15:
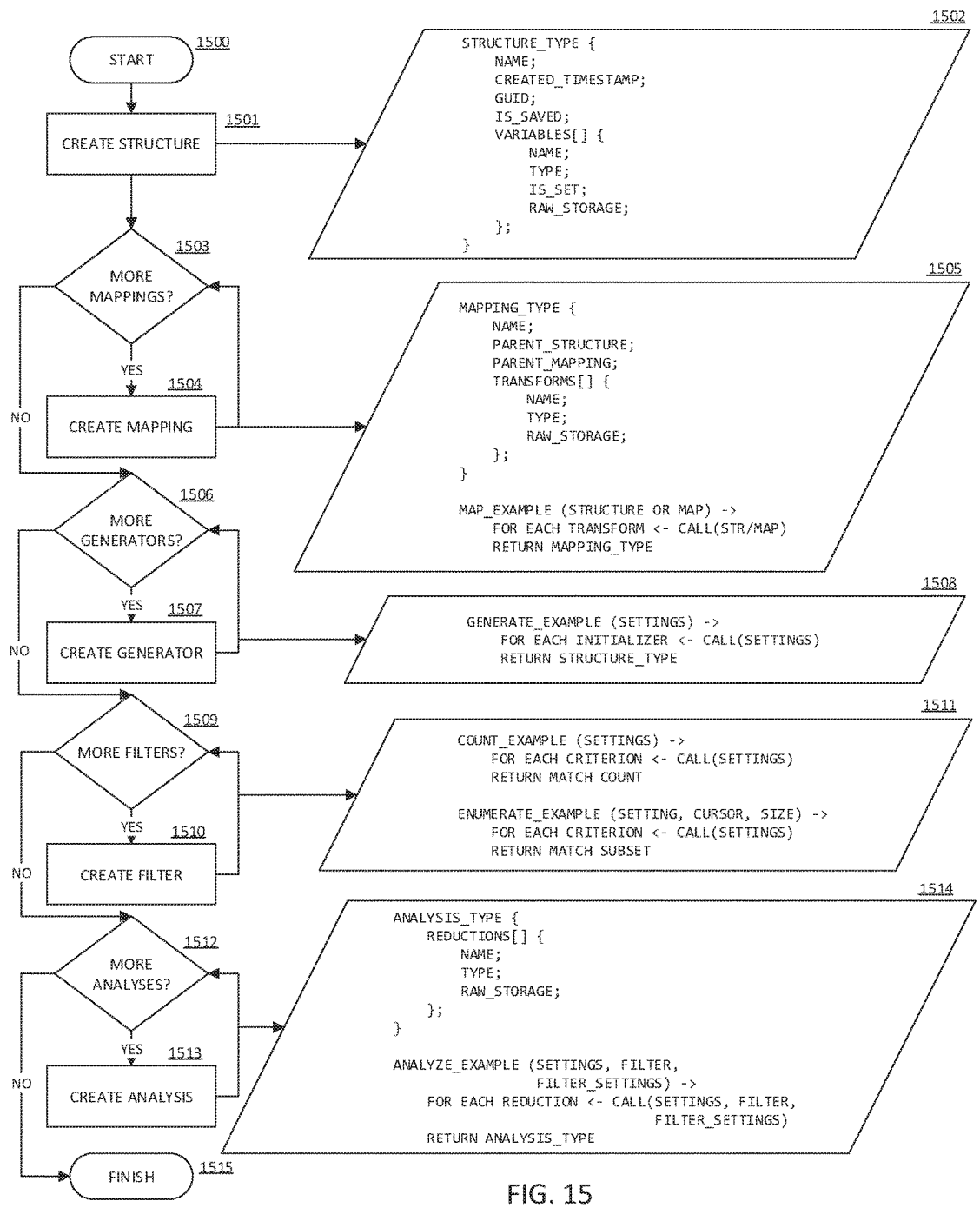
FIG. 15 is a flow chart illustrating one example of the native source code generation process.

FIG. 15 shows the flow of the native source code generation process. This process is performed for each structure 300 in the model manager 104 and for all of the structure's 300 dependent objects such as mappings 400 or filters 700. Upon start 1500, initial boilerplate code is generated and the structure 300 source code is created 1501 as a C "struct" element in the preferred embodiment, shown in the pseudocode output 1502 with all of the dependent properties of an event 600 as this forms the raw memory storage for all events. In the preferred embodiment, variables are directly named and included in the "struct" element as var_NAME where NAME is replaced with the variable identifier rather than the array representation shown in the pseudo-code 1502.

For each 1503 mapping 400 the preferred embodiment creates 1504 a new mapping C "struct" element and a new mapping function, as shown in the pseudo-code 1505. The mapping "struct" transforms are directly named and includes as transform_NAME where NAME is replaced with the transform identifier rather than the array representation shown in the pseudo-code 1505. The mapping function takes the parent structure or map (either or, depending on whether the parent is a structure or map) and calls the corresponding transform script for each transform in the mapping 400, returning a new mapping_type instance.

For each 1506 generator 500 the preferred embodiment creates 1507 a new generation function 504, as shown in the pseudo-code 1508. This function accepts the generator's 500 settings and calls the corresponding initializer script with the settings for each initializer, returning a new event instance 600 of the structure_type upon completion.

For each 1509 filter 700 the preferred embodiment creates 1510 a new counting function 704 and a new enumeration function 705, as shown in the pseudo-code 1511. The counting function 704 accepts the filter's 700 settings and calls the criterion script for each criterion on each structure_type event instance 600 in the database. The count of how many event instances 600 matched the criteria is returned. The enumeration function accepts the filter's 700 settings, an optional cursor object to page through results, and a fetch size parameter. The enumeration function 705 calls the criterion script for each criterion on each structure_type event instance 600 within the cursor and fetch size page window, returning the actual event data of structure_type for all event instances 600 matching the criteria.

For each 1512 analysis 800 the preferred embodiment creates 1513 an analysis reduction type to hold analysis results and an analysis function 804, as shown in the pseudo-code 1514. The analysis function 804 accepts the analysis' 800 settings, a filter 700, and settings for the filter. This function 804 then calls the reduction script with the setting, filter, and filter settings for each of the analysis' 800 reductions, reducing across the parameterized filter events for each reduction variable. Once reduction is complete, the analysis function 804 returns the resulting analysis_type object. Having completed generation of all "structs" and functions, the finishing boilerplate code is created 1515, source generation 1006 is complete, and compilation and relinking 1007 may commence.

Computer Program Code and Machine-Readable Storage Media

Any combination of one or more computer readable medium(s) may be utilized in connection with implementation of various embodiments. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction implementation system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction implementation system, apparatus, or device.

Program code embodied on a computer readable medium may be transmitted using any appropriate medium, including but not limited to wireless, wire line, optical fiber cable, RF, etc. or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may be implemented entirely on the users computer, partly on the users computer, as a stand-alone software package, partly on the users computer and partly on a remote computer or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

It will be obvious to those having skill in the art that many changes may be made to the details of the above-described embodiments without departing from the underlying principles of the invention. The scope of the present invention should, therefore, be determined only by the following claims.

The invention claimed is:

1. In a server computer, a method comprising:
providing an API access layer for a client entity to interface with the server;
providing a model manager component performing creation, deletion, enumeration and use of data models stored in the server computer;
storing a data model in memory in the server, utilizing the model manager component, responsive to client commands via the API access layer;
wherein storing the data model includes creating at least one named structure associated with the model, the named structure defining at least one variable and a type of the defined variable;
selecting a target programming language;
providing to the API access layer a base client library implemented in the target programming language;
triggered by creation of the named structure, coding the named structure to form at least one internal source code file;
compiling the internal source code file into native machine code of the server;
dynamically linking the native machine code into a function table associated with the stored data model;
generating an interface associated with the named structure, to expand functionality of the stored data model, by generating an internal model-specific interface library that is conformant with a syntax of the target programming language and matches the defined structure of the stored data model;
receiving a command, via the API access layer, for the client entity to access the stored data model, the received command conformant with the syntax of the target programming language; and
executing the received command through the dynamically linked function table to utilize the native machine code on the server so that operations expressed by the client using the model specific interface library of the API access layer are executed utilizing native machine code on the server.

2. A computer-implemented database analytics system comprising:
an API access layer arranged to enable a client to access the system, wherein the API access layer includes a base client library implemented in a user-selectable target programming language;
a data model manager component performing creation, deletion, enumeration, and use of data models stored in the system, wherein a stored data model includes a programmatically defined structure of the data model, and at least one dependent analytical function associated with the data model;
a data model source code generator configured to convert the stored data model to an internal source code file;
an interface generator component configured to generate a model specific interface library that is conformant with a syntax of the target programming language and that matches the defined structure of the stored data model; and that implements the dependent analytical function associated with the model; and
a compiler and linker component arranged to compile the internal source code file into native machine code and link the native machine code into a function table associated with the data model so that operations expressed by the client using the model specific interface library of the API access layer will be executed utilizing the native machine code on the server.

3. The system of claim 2 wherein the dependent analytical function of the stored data model comprises one of a mapping function, a filter function and an analysis function.

4. The system of claim 2 and further comprising a Task Dispatcher component to enable parallelized task completion of selected model tasks requested via the API access layer while maintaining a known data model state.

5. The system of claim 2 wherein each of the following actions automatically triggers the compiler and linker component to compile the internal source code file into native machine code, link the native machine code into the function table associated with the data model, and update the interface models created by the interface generator:
creating or deleting a structure;
creating or deleting a generator;
creating or deleting a mapping;
creating or deleting a filter; and
creating or deleting an analysis.

6. The system of claim 2 wherein the API access layer includes a structures component configured to, responsive to an "interface structure" command, create an API library for the stored data model.

7. The system of claim 2 and further comprising a Scripting System component;
wherein the scripting system provides a scripting library that implements a predetermined set of functions, each of the functions available in a form conformant with a syntax of the target programming language;
the scripting library is realized in the API access layer for use by the client to interact with the data model in the target programming language.

8. The system of claim 7 and further efficiency is gained by transcompiling the scripts to the highly performant "C" programming language as part of the source generation of the models by the model source generator, which converts the model to "C" source files.

9. A system comprising:
a server computer, the server computer coupled to a non-volatile, computer-readable memory storing machine readable instructions to cause the server, when the instructions are executed, to implement a database system including the steps of:
storing a data model in memory in the server, the data model including a programmatically defined structure;
providing an API access layer for a client to access the server;
coding the defined structure of the stored data model to form at least one internal source code file;
providing a structures subsystem with a corresponding API to manage structures of the data model, the structures subsystem including respective components to list structures, to create a new structure, and to delete a selected structure, wherein creating a new structure incorporates a structure name and a list of variables;
providing a generator subsystem with a corresponding API to enable the client to manage generators of the data model, each generator associated with a corresponding parent structure, the generator subsystem including respective components to list generators, to create a new generator, to delete a selected generator; and the generator subsystem further including a component to create a new event instance based on an existing generator, wherein the new event instance comprises a particular instantiation of the parent structure for storing and processing data in the server;

wherein a generator includes a set of initializers to set starting values of corresponding variables of the new event instance except for the variables set by the client; and wherein at least one of the initializers is configurable to utilize a random value to set its corresponding variable.

10. The system of claim 9 wherein the specified setting includes at least one input variable with name, type, and applicable constraints.

11. The system of claim 9 wherein the data model includes a corresponding structure name and a list of variables, and at least one analytical function associated with the data model; and wherein the stored instructions are arranged to further cause the server to carry out the steps of:

generating a model specific interface library that is conformant with a syntax of a target programming language and that matches the defined structure of the stored data model; and wherein the model specific interface library implements the analytical function of the data model.

12. The system of claim 11 and wherein the stored instructions are arranged to further cause the server to carry out the steps of, responsive to a client request to interface a selected structure:

generating a model specific interface library conformant with a syntax of a target programming language identified in the request, wherein the model specific interface library implements the selected structures of the data model; and generating, compiling and linking at least one internal source code file into native machine code for execution on the server to implement the structures of the data model.

13. The system of claim 9 and wherein the stored instructions are arranged to further cause the server to carry out the steps of:

providing a filters subsystem with a corresponding API to enable the client to manage filters of the data model, the filter subsystem including respective components to list filters, to create a new filter, to delete a selected filter; to implement a count filter; and to enumerate filtered results.

14. The system of claim 13 wherein:

a client request to create a new filter specifies a filter name, parent structure name, criteria and settings; and the criteria include at least one criterion expressed as a script function that returns a Boolean value.

15. The system of claim 9 and wherein the stored instructions are arranged to further cause the server to carry out the steps of:

providing an analysis subsystem with a corresponding API to enable the client to manage analysis of the data model, the analysis subsystem including respective components to list analyses, to create a new analysis, to delete a selected analysis; and to conduct an analysis based on a specified existing analysis, a setting, a filter name and a filter setting all specified in the request to conduct an analysis.

16. The system of claim 15 wherein a request to create a new analysis includes a parent name, an analysis name, a reduction and a setting; and wherein the reduction is defined by a programming script expressed in a script language that is purely functional and has a strictly deterministic operation allowing real-time characteristics.

17. The system of claim 9 and wherein the stored instructions are arranged to further cause the server to carry out the step of:

providing a mapping subsystem with a corresponding API to enable the client to manage mappings of the data model, the mapping subsystem including components to list mappings, to create a new mapping, and to delete a selected mapping;

wherein each mapping is configured to generate a transformed view of an associated structure.

18. The system of claim 17 wherein:

a request to create a new mapping specifies a mapping name, a parent data model name and a transform for creating the transformed view; and the transform is defined using a predetermined programming script language.

19. The system of claim 18 wherein the script language is purely functional and has a strictly deterministic operation allowing real-time characteristics.

20. The system of claim 18 wherein the stored instructions are arranged to further cause the server to carry out the steps of:

generating a model specific interface library consistent with a syntax of a target programming language to implement a requested new mapping; and generating, compiling and linking native source code for execution on the server to execute the new mapping.

* * * * *